United States Patent [19]
McKethan

[11] 3,759,545
[45] Sept. 18, 1973

[54] CONVERTIBLE, ARTICULATED VEHICLE
[76] Inventor: Eddie B. McKethan, Rt. 1, Box 162, Wade, N.C.
[22] Filed: June 25, 1971
[21] Appl. No.: 156,826

[52] U.S. Cl............. 280/423 R, 280/434, 280/421, 280/124 R, 188/3
[51] Int. Cl............................................ B62d 53/08
[58] Field of Search................ 280/423 R, 434, 438, 280/407

[56] References Cited
UNITED STATES PATENTS

| 2,461,577 | 2/1949 | Stark | 280/423 R X |
|---|---|---|---|
| 2,478,578 | 8/1949 | Gottshall | 296/35 A |
| 2,676,033 | 4/1954 | Housh et al. | 280/438 |
| 2,925,286 | 2/1960 | Hodges | 280/434 |
| 2,977,137 | 3/1961 | Durham | 280/434 |
| 3,339,941 | 9/1967 | Braunberger | 280/407 |
| 3,392,992 | 7/1968 | Baker et al. | 280/423 R |

Primary Examiner—Leo Friaglia
Attorney—John G. Mills, III

[57] ABSTRACT

In abstract, a preferred embodiment of this invention is a pick-up type truck which is convertible into an articulated, tractor-trailer type vehicle. This is accomplished by a bed mounted fifth wheel with a locking mechanism and brake and light connection.

5 Claims, 8 Drawing Figures

PATENTED SEP 18 1973 3,759,545

EDDIE B. McKETHAN
INVENTOR

BY John G. Mills
ATTORNEY

EDDIE B. McKETHAN
INVENTOR

BY John G. Mills
ATTORNEY

CONVERTIBLE, ARTICULATED VEHICLE

This invention relates to vehicles and more particularly to a pick-up truck type land vehicle convertible into an articulated tractor-trailer type unit.

In the past, farmers and other people having pick-up type trucks have had need for additional load carrying capabilities. This need has quite often been met by either a two wheel or a four wheel trailer connected to the rear of the pick-up truck by either a ball and socket coupler or a pintle assembly connection. When bulky, heavy loads are placed on a trailer so connected, the trailer becomes extremely unstable and is dangerous to operate at any greater than a very slow speed. Thus the driver of the truck is faced with the dilemma of either having to drive very slowly to maintain control of the trailer while creating a traffic hazard for other users of the highway or driving faster and taking a chance on loosing complete control of the entire rig. This has been particularly true in the moving of such crops as tobacco, bailed hay and the like from farm to market.

The present invention has been developed after much research and study into the above mentioned problems and is designed to allow an ordinary pick-up type truck to be used as a tractor unit for a tractor-trailer type rig without impairing the use of the tractor as a pick-up. Through the use of unique couplings and power supply connections, a stable tractor-trailer type vehicle can be created from an ordinary pick-up truck. When the use of the tractor-trailer is no longer needed, the tractor portion can readily be reconverted to a pick-up type truck for use with small loads and other purposes to which such a vehicle is particularly adapted.

It is an object, therefore, of the present invention to provide a means for converting a pick-up type truck to a tractor unit for a tractor-trailer type vehicle.

Another object of the present invention is to provide coupling and connector means for connecting a pick-up truck to a fifth wheel type articulated trailer.

Another object of the present invention is to provide a truck-to-trailer hydraulic braking means including at least two separate and distinct closed circuit hydraulic systems.

A further object of the present invention is to provide connector means between the hydraulic system of a truck and a separate and distinct hydraulic system on a trailer adapted to be towed by said truck.

An additional object of the present invention is to provide a simple yet effective trailer under carriage support system.

Another object of the present invention is to provide a fifth wheel type trailer connection useable in conjunction with a pick-up type truck wherein a trailer can be connected to such truck without removal of the pick-up body.

Another object of the present invention is to provide a readily attachable and detachable fifth wheel type connection for converting a pick-up type truck into a tractor type unit of a tractor-trailer rig.

Another object of the present invention is to provide a trailer parking brake of simple yet efficient design.

Another object of the present invention is to provide a trailer wheel brake operable from a position adjacent the trailer-to-tow-vehicle connecting point.

Another object of the present invention is to provide a vehicle spring load increasing means which does not alter the distance between the vehicle axle and its frame.

Another object of the present invention is to provide a readily removable fifth wheel connection adapted to be used in conjunction with a tow vehicle.

Another object of the present invention is to provide a self-locking fifth wheel type trailer connection.

Another object of the present invention is to provide a self-locking fifth wheel connection for trailers including a means to hold such fifth wheel locking mechanism in unlocked position until the trailer coupling is in operative connection therewith.

Other objects and advantages of the present invention will become apparent and obvious from a study of the following description and the accompanying drawings which are merely illustrative of such invention.

With further reference to the drawings, a pick-up type truck indicated generally at 11 is adapted, as will hereinafter be described, to pull a fifth wheel connected trailer 12.

Figure 1:
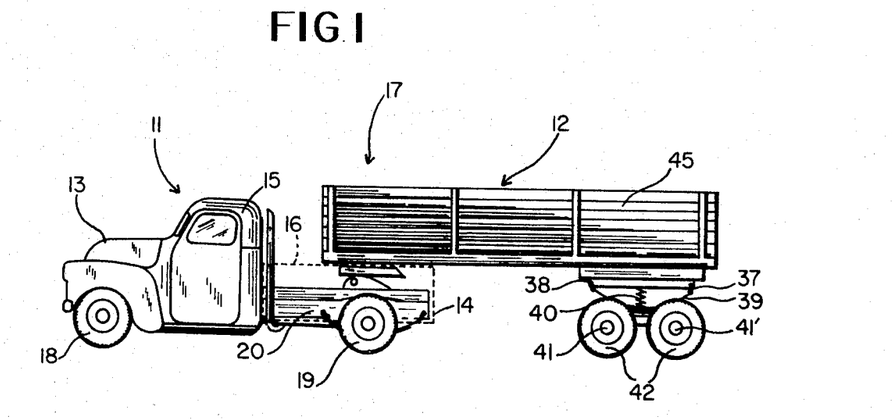
FIG. 1 is a side elevational view of a pick-up truck type vehicle serving as tractor portion of an articulated tractor-trailer type rig.

The truck 11 has a front portion 13, a rear portion 14 and a cab 15 within which the operator (not shown) sits. The rear portion 14 of the truck 11 has a standard pick-up type body shown for clarity of illustration in dotted lines at 16 in FIG. 1. This body can be removably mounted so that the truck 11 can be used either with or without the pick-up body when it is used as a tractor unit for the tractor-trailer rig indicated generally at 17.

The truck 11 includes a pair of front directional turning wheels 18 and a pair of rear directionally fixed drive wheels 19. Operatively attached to both pairs of wheels and supporting both the pick-up bed 16 of cab 15 and the other operative parts of the truck 11, is a frame 20 which is composed of two parallel members. Operatively secured to the rear portion of each of these members are spring hangers 21 and shackles 21' which support leaf type springs 22. To the central portion of each of the leaf springs 22 attached to the frame 20, and extending between such springs, is the rear axle 23 of the truck 11; said axle supporting the rear drive wheels 19.

To support heavy loads without flattening springs 22, additional spring means have been added in the form of coil springs 24. There is one of these springs between each of the leaf springs 22 and their respective portion of frame 20. By using coil springs at these points, the vehicle body is disposed at its normal height above the ground with no visual evidence of additional springs having been added. When heavy loads are applied, however, the coil springs help to support the weight of such load thereby preventing the leaf springs from becoming overloaded. Thus it can be seen that through using coil springs as overload members, the extra heavy, extra large springs generally associated with overload means have been eliminated.

Figure 6:
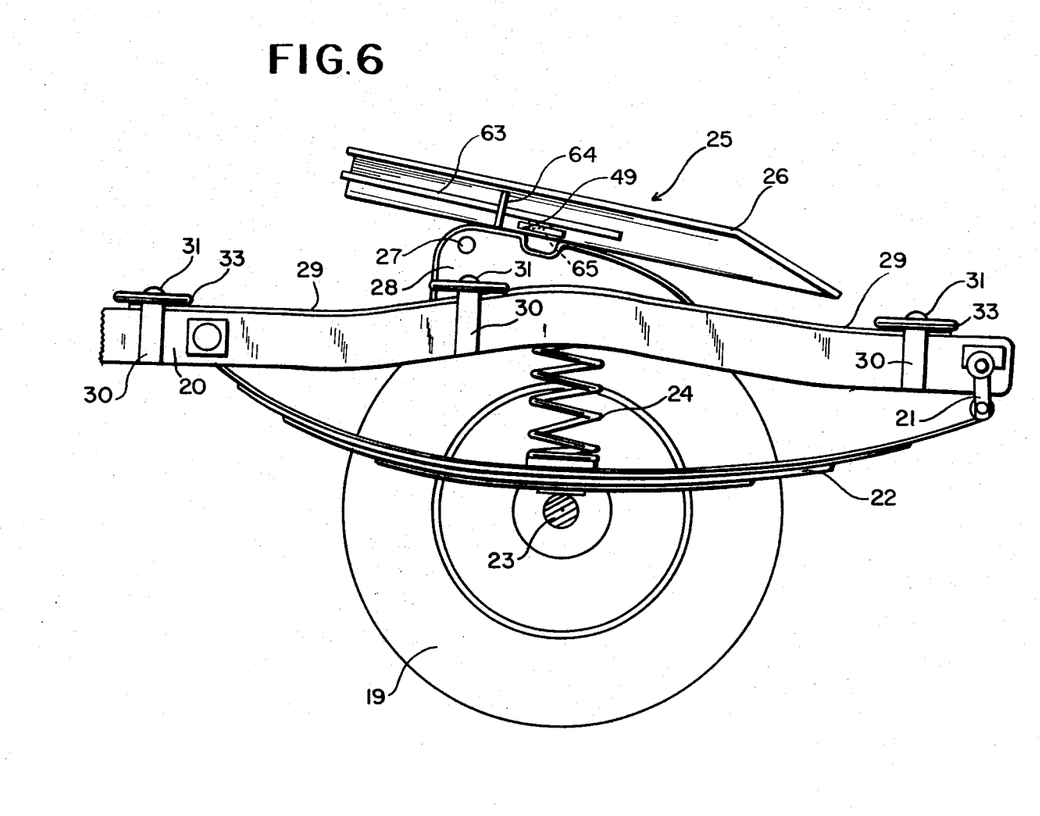
FIG. 6 is a side elevational view of the fifth wheel and its mounting frame.

The rear portion of the truck frame 20 is adapted to receive a lower fifth wheel assembly indicated generally at 25. This assembly includes a lower fifth wheel 26, a king pin locking mechanism which will hereinafter be described in detail, a rocker pin 27 pivotably securing the lower fifth wheel 26 to upright support members 28 and bed plates 29 fixedly secured to said upright members. These bed plates are so designed as to overlie the parallel rear portions of frame 20. If the frame is flat then the bed plates would be flat; or if the frame is curved, as illustrated in FIG. 6, then the bed plates would, of course, be contoured accordingly. Again the rig of the present invention is shown generally without the pick-up body being attached to the frame 20; however, it is definitely contemplated that the lower fifth wheel 25 can be mounted within such body 16 as seen clearly in FIG. 1. In such case, the bed plates 29 would be generally flat since the floor or bed portion of a pick-up body is generally flat.

In either case, at least two pairs of mounting tabs or flanges 30 are fixedly secured to frame 20 in spaced relation to each other. These flanges are preferably welded to the frame and have an opening in the upper portion thereof. Each flange projects preferably above the normal location of the bed plates 29 and can either project through a slot in such bed plate or can be so disposed that openings in retainers 31 (fixedly secured to the bed plates 29) line up with the openings in the flanges. In either case, the bed plates 29 can be secured to the truck frame 20 by use of either bolts (not shown) or mounting pins such as those indicated at 32. If the mounting pins are used, they would preferably extend through each matched pair of flanges 30 and their aligned retainers 31.

To facilitate insertion and removal of the pins 32, a handle 33 is attached to one end thereof. The other end includes a retaining means such as cotter pin 34.

From the above, it can be seen that when the fifth wheel assembly 25 is placed either on the bed portion of the pick-up body 16 or juxtaposed to the frame 20 of truck 11, it can be so adjusted that openings in retainers 31 are aligned with the openings in the mounting flanges 30 so that pins 32 can be passed therethrough to releasably secure said fifth wheel assembly to the rear portion 14 of the truck 11. Conversely, the fifth wheel assembly can be readily removed from the truck by pulling the cotter pins 34 and removing the mounting pins 32 by handles 33. Once the mounting pins have been pulled, the entire fifth wheel assembly can be picked up or otherwise removed from the truck.

A typical trailer 12, used in conjunction with the truck 11 of the present invention, includes a pair of generally parallely disposed frame members 35 to the rear portion of which is secured spring mounting blocks 36. At one end of each block is a spring hanger 37 and at the other end is a spring shackle 38. Operatively mounted between each matched hanger and shackle is a leaf type spring 39. Between the center portions of each of these springs and the center portion of its associated spring mounting block 36 is a coil spring 40 which is used for overload purposes as hereinabove described for springs 24.

Between the trailer leaf springs 39 are disposed tandem trailer axles 41 and 41' upon which trailer wheels 42 are rotatively mounted.

If deemed desirable or necessary, the trailer frames 35 can be stiffened against warping under load conditions by means such as stringers 43 and spacers 44 fixedly secured to each of such frames.

Although obviously various body configurations can be used for trailer 12, stake sides 45 have been shown because of their easy removability to form a flat bed type trailer vehicle.

Fixedly secured to and between the trailer frames 35, at the forward end thereof, is a fifth wheel bearing plate 46. Extending downwardly from this plate, generally in the center thereof, is the upper fifth wheel kingpin 47. This kingpin is, of course, adapted to operatively engage the lower fifth wheel and to be secured thereto for pivotable movement.

To lock the upper fifth wheel kingpin 47 in operative engagement with the lower fifth wheel 26, a locking assembly is provided which includes longitudinally slidable locking pin 48. This pin passes through the inner side walls 50 and outer side walls 51 of the lower fifth wheel 26 as well as through reinforcing partition 52. A handle 49 is provided on the exterior end of locking pin 48 and a spring attaching flange 53 is fixedly secured to such pin intermediate its ends. A biasing spring 54 is secured to said flange and to a flange 55 that is secured to reinforcing petition 56. Thus it can be seen that locking pin 48 is biased toward its locked position which is shown in solid lines in FIG. 4.

Figure 4:
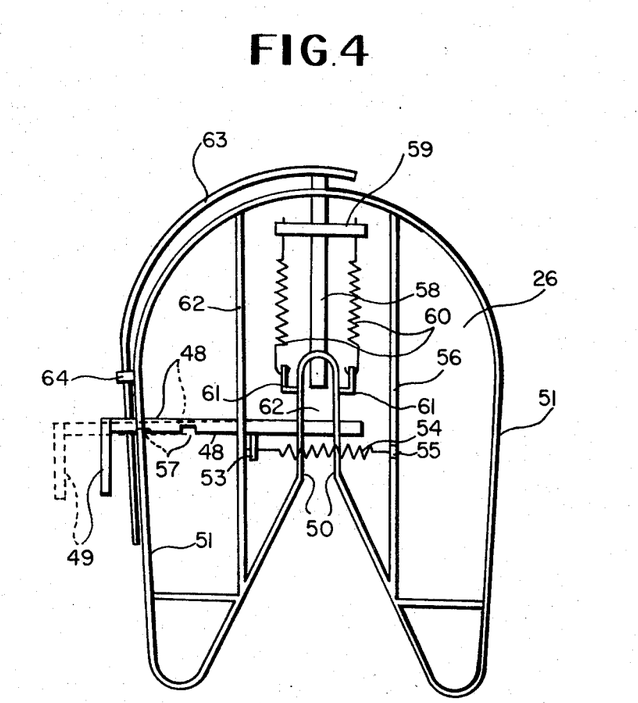
FIG. 4 is a bottom plan view of the automatic fifth wheel latching mechanism of the present invention.
Figure 5:
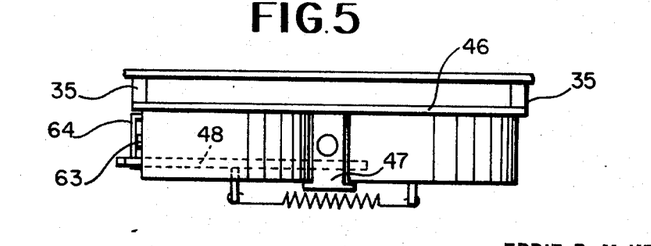
FIG. 5 is a rear elevational view of such fifth wheel.

To unlock the fifth wheel coupling, handle 49 can be used to pull pin 48 to its position shown in dotted lines in FIG. 4. The notch 57 in such pin can be used to engage the edge of the opening through the outer wall 51 of the fifth wheel 26 thus holding such pin, against the bias of spring 54, in the unlocked position. It is understood, of course, that the opening in reinforcing partition 52 through which pin 48 passes has to be somewhat enlarged to accommodate the movement of such pin laterally for notch engagement.

Whenever, of course, it is desired to release pin 48 from its unlocked position, all that is necessary is for it to be moved laterally just far enough for the notch 57 therein to become disengaged from wall 57 so that the bias of spring 54 can pull such pin into its locked position and hold the same there.

Since it is not always possible to have an attendant standing by to determine when the kingpin is in proper position relative to the lower fifth wheel so that locking pin 48 can be released, an automatic release mechanism has been provided. This mechanism includes a trip pin 58 which passes through the inner and outer walls 50 and 51 of fifth wheel 26 in a manner similar to locking pin 48. A spring mounting cross member 59 is fixedly secured to pin 58 and has attached to each of its ends biasing springs 60. The other end of each of these springs is secured to a mounting flange 61 secured to inner wall 50 as seen clearly in FIG. 4. The end of trip pin 58, opposite the kingpin engagement opening 62 is secured to unlatching arm 63. This arm generally contours to the outer wall 51 of fifth wheel 26 and is slidably supported at its end opposite pin 58 by support 64. Fixedly secured to the lower portion of arm 63, is unlatching block 65 which is disposed adjacent locking pin 48. Thus it can be seen that when the kingpin 47 of a trailer 12 is pushed into the area between inner walls 50, it will engage trip pin 58 and move the same longitudinally. This movement will be imparted to unlatching arm 63 and its unlatching block 65. This block will engage the locking pin 48 and move it in the direction opposite notch 57 thus disengaging such notch. When this occurs, the locking pin will be smartly driven home by spring 54. The tractor and trailer by such action automatically become operatively secured together to form an articulated tractor-trailer type rig.

The reason that biasing spring 54 is mounted below the fifth wheel 26 is that it must be located in such a position as to clear the kingpin when it is being moved into operative position within opening 62.

Figure 2:
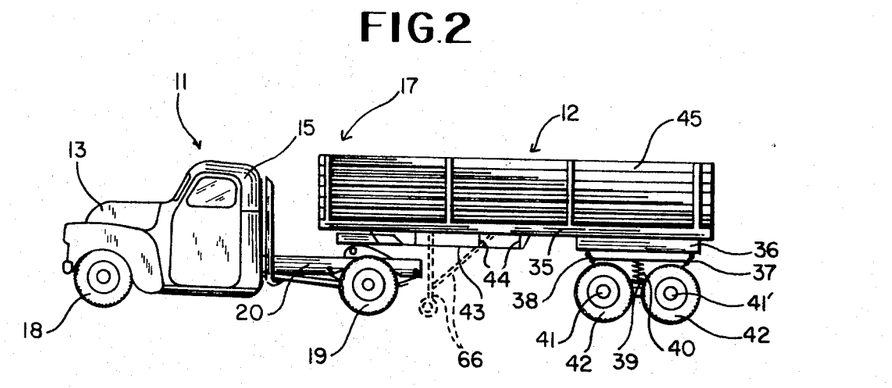
FIG. 2 is a side elevational view of a pick-up type truck with the pick-up bed removed, acting as the tractor portion of an articulated tractor-trailer type rig.
Figure 3:
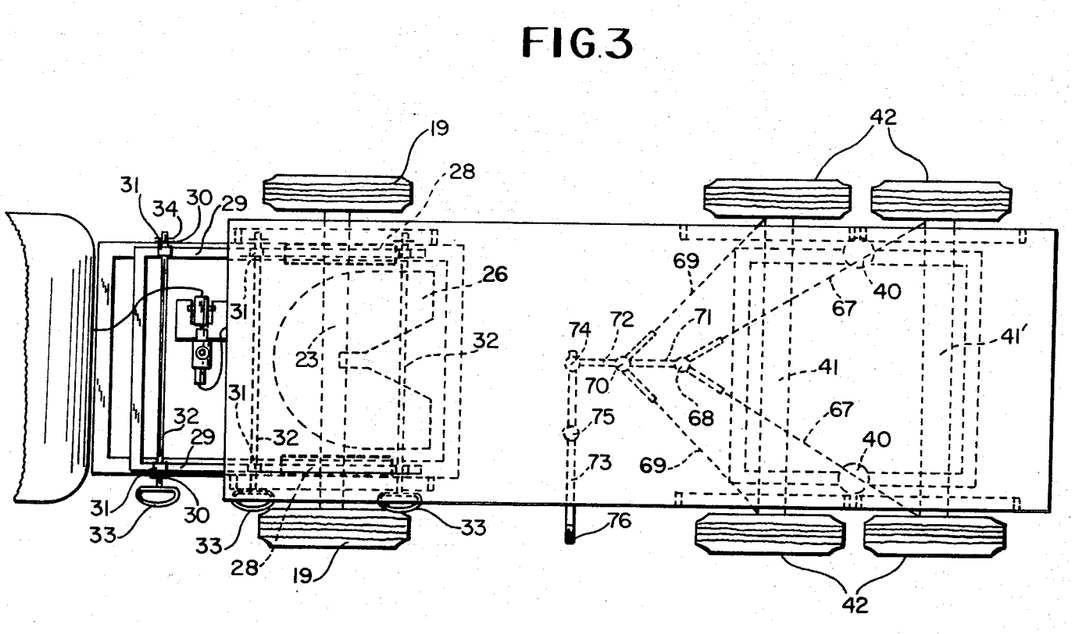
FIG. 3 is a top plan view of a portion of a tractor and its connected trailer showing various features of the present invention.

A standard trailer landing gear such as that shown in dotted lines at 66 of FIG. 2 can be provided for supporting the trailer 12 when connecting and disconnecting the same from the truck 11 as well as supporting such trailer when it is disconnected.

The trailer of the present invention is preferably equipped with hydraulic brakes since air brakes so commonly found on tractor-trailer rigs would not be particularly economical for use in connection with a pick-up truck type tractor. Since parking brakes of hydraulic type systems are usually composed of a cable attached directly to at least one brake shoe (not shown) of each wheel effected. Using this standard brake shoe connection, a special trailer parking brake system has been developed. It consists of a pair of rear brake cables 67 operatively connected to the brakes (not shown) associated with the wheels 42 mounted on the rear tandem axle 41'. The other end of these cables are attached together at juncture 68. A second pair of brake cables 69 terminate in operative connection with the brakes (not shown) associated with the trailer wheels 42 mounted on forward tandem axle 41. This last mentioned pair of cables terminate at their ends opposite the brakes at juncture 70. Each of the two cable junctures 68 and 70 are connected by their respective linkages 71 and 72 to brake lever 73 at point 74. Lever 73 is pivotably mounted at point 75 so that when the handle 76 of such lever is moved rearwardly, linkage connection point 74 will move forwardly thus engaging the parking brake of each trailer wheel 42. Any convenient retaining means (not shown) such as a pawl and ratchet, a hook and chain, a length of rope, or the like can be used to hold lever 73 in the parked position so that trailer 12 can only be moved after such lever has been released and allowed to return to a non-biased position.

Whenever the articulated trailer rig of the present invention is operatively connected together, the trailer electrical system (not shown) including running or parking lights, brake lights, and turn signal lights can be connected to the truck tractor electrical system (not shown) by standard and well known connecting means (not shown).

Since most States require tandem axled trailers to have brake systems, a hydraulic type system is preferably provided in connection with the present invention. To eliminate direct hydraulic connection and disconnection (which would require the entire braking system to be "bled" before each use), a quick connect and disconnect system has been developed utilizing a separate hydraulic system for both the truck 11 and the trailer 12. The truck hydraulic system includes a foot operated brake pedal 77 which is used to actuate master cylinder 88 which from hydraulic line 79 and branch lines 80 actuate brake cylinders 81, one of said last mentioned cylinders being operatively associated with each of the four wheels of vehicle 11. Hydraulic line 79 also extends to trailer connecting cylinder 82 so that such cylinder will be operated with generally the same braking pressures as the brake cylinders and, of course, controlled by brake pedal 77.

Figure 7:
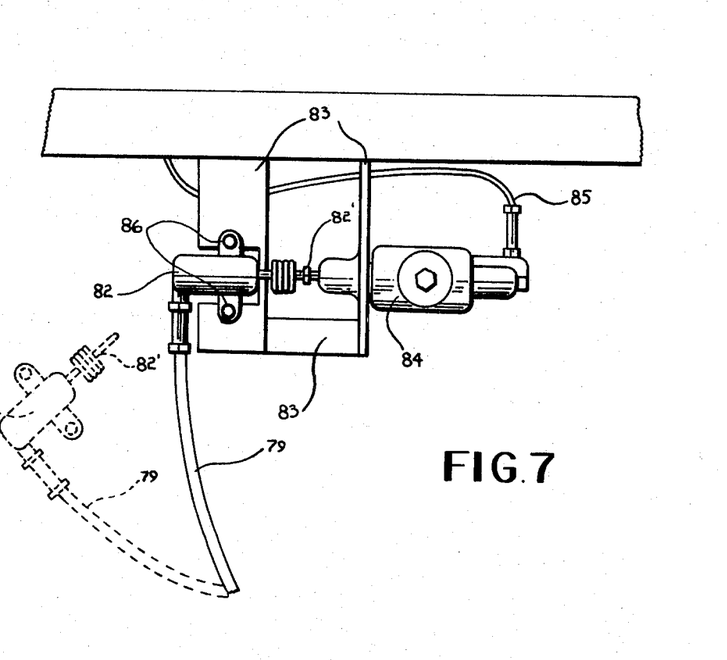
FIG. 7 is a top plan view of the hydraulic system's connector.
Figure 8:
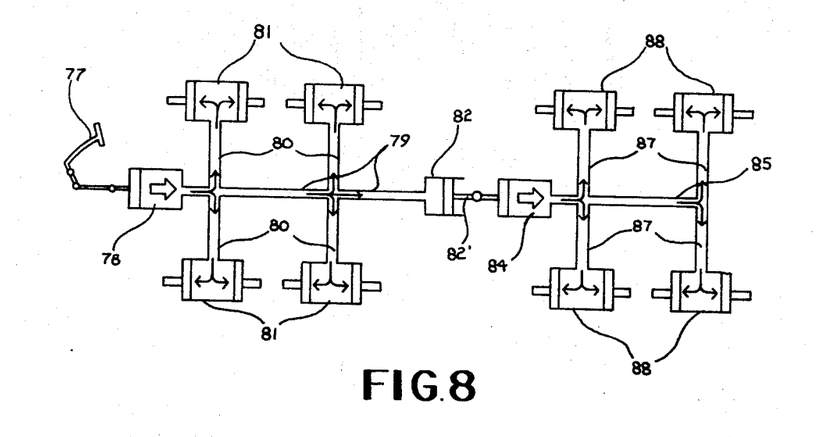
FIG. 8 is a schematic of the tractor and trailer hydraulic systems.

At a convenient location, preferably on the end of trailer 12 adjacent its tractor 11, is a hydraulic system's connecting bracket 83. This bracket permanently mounts the trailer master cylinder 84 and its associated hydraulic line 85. A quick connect and release means 86 is provided for cylinder 82 adjacent master cylinder 84 as seen clearly in FIG. 7. The quick connect and disconnect means 86 can be either studs with associated wing nuts, or any one of a plurality of other locking or latching means so long as a tight, relatively immovable connection is made. This rigid connection is necessary since the piston rod 82' of cylinder 82 is in operative contact with the trailer master cylinder 84 and actuates the same in a manner similar to the action of brake pedal 77 on the truck hydraulic master cylinder 78.

Trailer master cylinder 84 is connected through main hydraulic line 85 and branch hydraulic lines 87 to the plurality of brake cylinders 88, one being operatively associated with each of the wheels 42 rotatively mounted on the tandem trailer axles 41 and 41'. Thus it can be seen that when brake pedal 77 is operated, the action of master cylinder 78 will operate the brake cylinders 81 of the truck wheels as well as cylinder 82. Cylinder 82 will actuate the trailer master cylinder 84 which in turn actuates the brake cylinders 88 of the trailer wheels 42 so that braking forces are applied not only to all four wheels of the pick-up type tractor unit 11, but also to the wheels of trailer 12.

Whenever it is desired to convert a pick-up type truck as indicated at 11 into a tractor-trailer type rig, the lower fifth wheel assembly would be either placed in the bed of the pick-up body 16, or such body could be removed and the assembly placed directly on the truck frame 20. In either case, the upper or tab portion of each of the mounting flanges 30 would align with a retainer 31 of the bed plates 29. Mounting pins 32 could then be slipped in the place and cotter pins 34 inserted to retain such pins. The fifth wheel thus mounted on the pick-up type vehicle has converted the same to the function of truck tractor. This tractor can then be backed to a point adjacent trailer 12 so that kingpin 47 will be aligned with opening 62 in the lower fifth wheel 25. As the truck tractor 11 is backed further, the kingpin will move into said opening and contact trip pin 58. This pin, through arm 63, will cause the notch 57 in locking pin 48 to become disengaged with the outer wall 51 of the fifth wheel and, because of the biasing of spring 54, will cause such pin to move into a locked position.

Once the kingpin and lower fifth wheel have been locked together as hereinabove described, cylinder 82 of the truck hydraulic system will be placed on bracket 83 of trailer 12 and connected thereto by quick connect means 86 as heretofore described. With the piston rod 82' in operative contact with the master cylinder 84 of the trailer brakes, a complete unitary braking system for tractor-trailer rig is provided. Standard electrical hook-ups (not shown) can then be made as necessary.

Next the landing gear 66 is retracted in the normal manner. Finally the parking brakes of trailer 12 are released by releasing the pressure on handle 76 to slack off on parking brake cables 67 and 69. At this point, of course, an emergency braking system could be effectuated by attaching a rod, cable or other means (not shown) to handle 76 which could be operated from cab 11 thus allowing such handle to be activated to apply the parking brake as emergency brakes through the tensioning of cables 67 and 69.

With the fifth wheels locked together and the trailer braking system operatively connected to the truck braking system, the rig is ready for use. Whenever it is desired to discontinue using the system as a tractor-trailer rig, it can be disconnected in reverse order from that hereinabove described by first dropping the landing gear 66, then setting the trailer parking brakes through manipulation of handle 76. The hydraulic systems can then be disconnected by release of quick disconnect means 86 of cylinder 82 and any electrical connection, disconnected. Handle 49 can then be used to pull locking pin 48 to the unlocked position and the same can be retained in such position by notch 57 being engaged with wall 51. Thus with the fifth wheel in unlatched condition, truck 11 can be moved forward to completely disengage such truck from trailer 12.

If the pick-up body 16 has been left on truck 11 while it was used as a tractor unit, such truck is now ready for use as a pick-up, with or without removal of fifth wheel assembly 25. If, of course, it is not anticipated that the truck will be used as a tractor in the immediate future, such as when all crops have been marketed from a farm, the fifth wheel assembly would be removed; however, if it is desired to use the truck 11 as a pick-up but thereafter reuse it as a tractor, the fifth wheel can be left in position since it takes up only a small percentage of the room within the bed 16.

In place of the fifth wheel assembly 25, a dump bed could be substituted therefor. In such case, the mounting flanges 30 fixedly secured to the frame 20 of vehicle 11 would be used. Also the bed plates 29 would be used as would the mounting pins 32 and their associated parts. A pivoted dump bed of conventional type would be secured to the bed plates 29 and a standard lift means for the pivoting body, such as a hydraulic cylinder (not shown) or the like, would be used. In other words, a standard configuration dump bed would be mounted on the frame 20 of the pick-up 11 in place of the fifth wheel assembly 25 but in the same manner as such fifth wheel by utilizing the quick mounting and dismounting features of the bed plates 29 and the mounted pins 32.

From the above, it is obvious that the present invention has the advantage of providing a means for converting a standard pick-up type truck into a truck tractor for use in combination with a semi-trailer. It is also obvious that the conversion from pick-up to tractor and back to pick-up is simple to effect and yet does not require more than nominal modification of such pick-up. The present invention also has the advantage of providing a tremendous hauling capacity for only a modest additional investment from that made in a pick-up type truck. The present invention also provides a safe, highway worthy, articulated vehicle that is uncomplicated to rig and unrig.

The terms such as "upper," "lower," "forward," "rear" and so forth have been used herein merely for convenience to describe the vehicle of the present invention and parts as oriented in the drawings. It is to be understood, however, that these terms are in no way limiting to the invention since the vehicle may obviously be disposed in many different positions when it is used.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A truck type vehicle convertible into a truck-tractor for connection to a semi-trailer thereby forming an articulated tractor-trailer type vehicle comprising: a pick-up type utility vehicle having a rear frame structure; a lower fifth wheel type trailer connecting assembly; quick connect and disconnect means overlying the rear frame structure of said pick-up type utility vehicle and adapted to support said fifth wheel connecting assembly thereabove, said quick connect and disconnect means including a bed plate having said fifth wheel mounting assembly secured thereon at least two pairs of transversely aligned longitudinally spaced flange means extending vertically from each side of said rear frame structure and a corresponding number of flange means at each longitudinal side of said bed plate, the latter flange means being transversely aligned with the corresponding pairs of said frame flange means, each pair of opposite flang means having transversely aligned apertures disposed above the bed plate to removably receive an elongated pin, said pin being normally disposed transversely over said bed plate in retaining relationship thereto, whereby said bed plate and associated fifth wheel assembly may be readily removed from said vehicle; a semi-trailer type vehicle; means secured to said trailer for coupling the same with said assembly whereby a utility truck can be readily converted into a tractor-trailer rig; and automatic locking means operatively associated with said fifth wheel assembly and responsive to the engagement of said trailer coupling means therewith for locking said trailer coupling within said fifth wheel assembly.

2. The truck type vehicle of claim 1 wherein said locking means comprises a locking pin slidably mounted within said assembly and biased toward a locked position; a trip pin means associated with said fifth wheel assembly for operative contact with said coupling means; and an unlatching arm fixedly secured at one end to said trip pin and operatively attached at the other end to said locking pin whereby said trip pin will cause said locking pin to move into a locked position when said coupling means contacts said trip means.

3. The truck type vehicle of claim 2 wherein said locking pin includes at least two laterally spaced slots formed therein; each being operative to engage a portion of said fifth wheel assembly such that said locking pin may be retained thereby; and wherein said unlatching arm is disposed exteriorly of said fifth wheel assembly and is generally arcuately shaped so as to wind around a portion of said fifth wheel assembly where said other end thereof is attached to said locking pin, said exterior arcuate shaped unlatching arm being operative upon actuation to disengage either of said notches from said fifth wheel assembly, thereby allowing said locking pin to move inwardly to its biased locked position.

4. The truck type vehicle of claim 3 wherein said fifth wheel assembly includes a continuous inner wall structure that defines a king-pin engagement opening adapted to receive said locking pin; and wherein said trip means comprises a longitudinal rod like member having one end normally extending into said king-pin engagement opening and the other end projecting forwardly therefrom through said fifth wheel assembly where said other end attaches to said arcuate shaped unlatching arm.

5. The vehicle of claim 1 wherein said trailer includes a landing gear type support operatively connected thereto.

* * * * *